United States Patent [19]
Yamada

[11] Patent Number: 6,166,733
[45] Date of Patent: Dec. 26, 2000

[54] INDEX INDICATOR, INDEX DISPLAY METHOD AND RECORDING MEDIUM STORING INDEX INDICATOR PROGRAM

[75] Inventor: Tsutomu Yamada, Kawasaki, Japan

[73] Assignee: Fujitsu Limited, Kawasaki, Japan

[21] Appl. No.: 09/148,331

[22] Filed: Sep. 4, 1998

[30] Foreign Application Priority Data

Mar. 19, 1998 [JP] Japan ................................. 10-070778

[51] Int. Cl.[7] ...................................................... G06F 3/14
[52] U.S. Cl. ........................ 345/333; 707/201; 345/326; 345/328
[58] Field of Search ........................ 707/1–10, 100–104, 707/200–206; 386/68, 46, 109; 345/326–358

[56] References Cited

U.S. PATENT DOCUMENTS

| 5,428,774 | 6/1995 | Takahashi et al. | 707/101 |
| 5,758,353 | 5/1998 | Marquis | 707/200 |
| 5,822,493 | 10/1998 | Uehara et al. | 386/109 |
| 5,875,445 | 2/1999 | Antonshenkov | 707/2 |
| 5,930,805 | 7/1999 | Marquis | 707/201 |

*Primary Examiner*—Ruay Lian Ho
*Attorney, Agent, or Firm*—Staas & Halsey LLP

[57] ABSTRACT

Intervals between a plurality of indexes are determined in accordance with the total number of data items and the number of data items corresponding to each of the plurality of indexes. The plurality of indexes are displayed at the intervals thus determined so that the user can readily know the number of data items associated with respective indexes and the distribution of the plurality of indexes.

21 Claims, 8 Drawing Sheets

FIG. 6

[ARRANGED IN THE ORDER OF 50 SYLLABLES]
<DB>
0001,石橋××,イシバシ××,Ishibashi ××,○○○○Co.Ltd. Tokyo ‥

0141,斎藤△△,サイトウ△△,Saito △△,△Trading Co.Tokyo‥

0312,津川○○,ツガワ○○,Tsugawa ○○,○○Construction.Osaka‥

INDEX INDICATOR, INDEX DISPLAY METHOD AND RECORDING MEDIUM STORING INDEX INDICATOR PROGRAM

BACKGROUND OF THE INVENTION

1. Field of the Invention

The present invention generally relates to index indicators, index display methods and recording mediums storing an index indicator program and, more particularly, to an index indicator, an index display method and a recording medium storing an index indicator program which indicator, method and medium are adapted to use in a search system.

2. Description of the Related Art

Conventional keyword-based systems including an address directory system and a customer management system provide selection of a desired keyword in the form of a scrolled display of keywords so as to allow associated information to be retrieved.

In the description below, it is assumed that the user may require a search in the Japanese language. Hereinafter, the term "line" is used to denote a set of syllables in the 50-syllable system of the Japanese language. For example, the "A" line comprises the syllables "A", "I", "U", "E" and "O", the "Ka" line comprises the syllables "Ka", "Ki", "Ku", "Ke" and "Ko", and so on. The syllables (referred to as letters in this specification) "A", "Ka", "Sa", "Ta", "Na", "Ha", "Ma", "Ya", "Ra" and "Wa" are at the head of the respective lines.

For example, Japanese Laid-Open Patent Application No. 7-212452 discloses a system for searching for a call destination from an electronic telephone directory, wherein a line-to-line scroll key is used to scroll through keywords in the order of "A", "Ka", "Sa", "Ta", . . . , and an intra-line scroll key is used to scroll through keywords in the order of, for example, "A", "I", "U", "E" and "O" in the "A" line.

Japanese Laid-Open Patent Application No. 8-297679 discloses a system wherein a slider for indicating a relative position in a list of search keys is displayed in association with an input frame in which a search key is entered. By sliding the knob of the slider, a search key corresponding to the knob position is displayed. When the search key displayed is asserted, the database is searched for the corresponding information.

In a system wherein the method disclosed in Japanese Laid-Open Application No. 7-212452 is used, the letters "A", "Ka", "Sa", "Ta", . . . at the head of the respective lines are scrolled through in the stated order using a line-to-line scroll key. With such a system, the user cannot know the number of keywords that begin with, for example, "A", "I", "U", "E" and "O" respectively. The same thing is true of the "Ka" line, "Sa" line, "Ta" line and so on. Moreover, this system requires two steps before reaching a keyword in that the user must scroll between lines and then scroll inside a selected line. Thus, the search according to such a system requires a cumbersome process.

In the system in which the method of Japanese Laid-Open Patent Application No. 8-297679 is used, the user can readily know that keywords that begin with the letter "A" are listed at the head of the slidable area, assuming that the search keys (keywords) are sorted in the order of 50 syllables of the Japanese language. However, the user cannot know the positions, in the slidable area, of keywords respectively beginning with, for example, the letters "Sa", "Ha" or "Yu". This is because the number of keywords that begin with one letter differs from that of another letter. For this reason, an extended period of time is required for the user to arrive at a desired search key by sliding the knob of the slider. Thus, the search according to such a system requires a cumbersome process.

SUMMARY OF THE INVENTION

Accordingly, an object of the present invention is to provide an index indicator, an index display method and a recording medium storing an index indicator program in which the aforementioned problems are eliminated.

Another and more specific object of the present invention is to provide an index indicator, an index display method and a recording medium storing an index indicator program in which the user can know the number of data items associated with each of a plurality of indexes and the distribution of keywords, in which the use can know the approximate position of the selected data relative to the whole body of data, in which the search does not require a cumbersome process, and in which high-speed search is possible.

The aforementioned objects can be accomplished by an index indicator that provides an index for assisting a search for a desired data item, comprising: an index interval determining unit for determining intervals between a plurality of indexes in accordance with a total number of data items and a number of data items corresponding to each of the plurality of indexes; a displaying unit for displaying the plurality of indexes in an index display area at the intervals determined by the index interval determining unit.

According the index indicator of the present invention, the user can readily know the number of data items.

The index indicator may further comprise: an indicator displaying unit for displaying, in an indicator display area, an indicator that aids selection of a desired data item from the entirety of data, the display being given in association with the index display area.

According to this aspect of the invention, the user can readily know the general location of the selected data item in the entirety of data.

Preferably, the index for the data item may be determined in accordance with a keyword associated with the data item and used in sorting the entirety of data.

According to this aspect of the present invention, the arrangement of data matches that of the keywords.

Preferably, the index indicator may further a comprise keyword displaying unit for displaying a keyword associated with the data item indicated by the indicator.

According to this aspect of the invention, a desired data item can be retrieved. Since the keyword for only one data item, instead of a list of keywords, is displayed, the display area is reduced.

Preferably, the keyword displaying unit may display the keyword adjacent to the indicator.

According to this aspect of the invention, different keywords are displayed depending on the position of the indicator. Thus, a high-speed search as performed in a book is implemented.

The indicator according may further comprise a sort selection unit for selecting a method of sorting the entirety of data and a type of index to be used in the sorting, and for sorting the entirety of data using the selected method.

According to this aspect of the invention, a search adapted to an object of the search or a user's requirement is enabled.

The index indicator may further comprise an unsorted data display unit for displaying data items that fail to be sorted.

According to this aspect of the invention, the user can search the unsorted data for a desired data item.

Various aspects of the invention may be implemented using a machine-readable recording medium storing an associated program.

BRIEF DESCRIPTION OF THE PREFERRED EMBODIMENTS

Other objects and further features of the present invention will be apparent from the following detailed description when read in conjunction with the accompanying drawings, in which:

FIG. 6 shows an arrangement of records in a database sorted according to the pronunciation of the names;

DETAILED DESCRIPTION OF THE PREFERRED EMBODIMENTS

Figure 1:
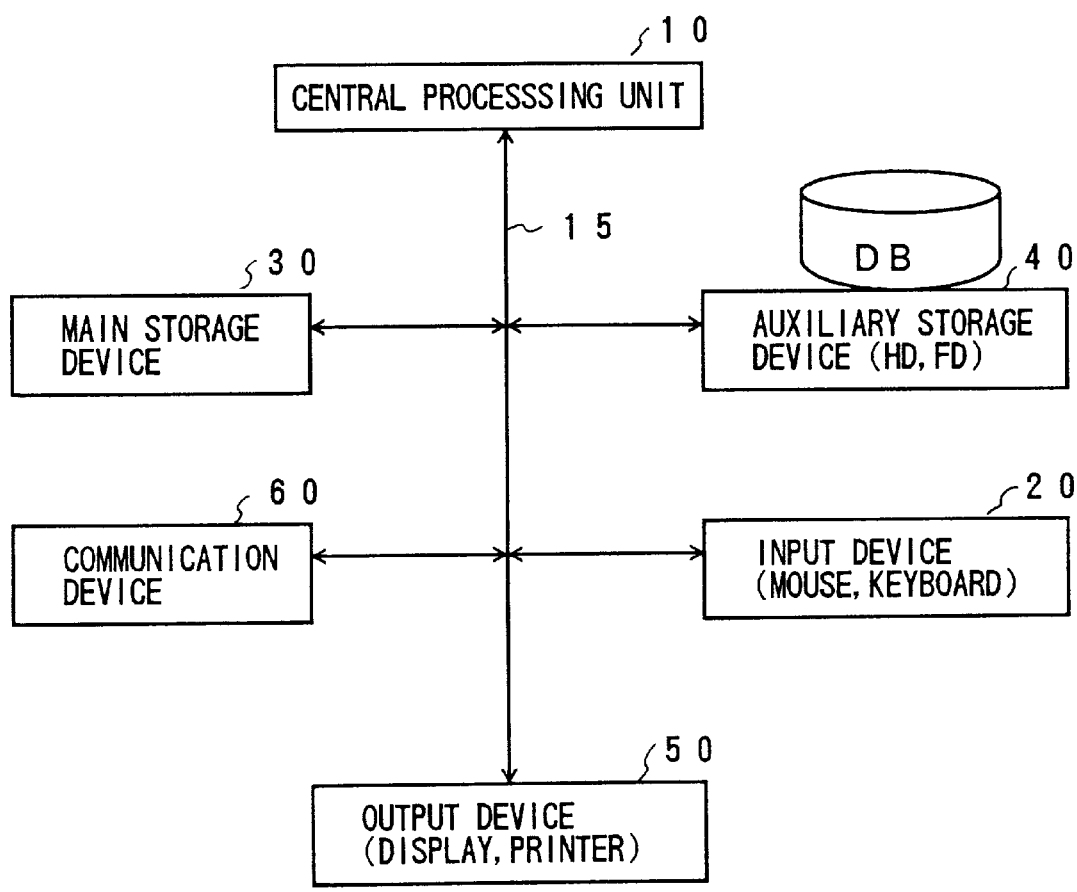
FIG. 1 is a block diagram of a search system to which an index indicator according to an embodiment of the present invention is applied.

FIG. 1 is a block diagram of a search system to which an index indicator according to an embodiment of the present invention is applied. Referring to FIG. 1, an input device 20, a main storage device 30, an auxiliary storage device 40, an output device 50 and a communication device are connected to a central processing unit (CPU) 10 via a bus 15. The input device 20 comprises a keyboard, a mouse and the like. The main storage device 30 comprises a RAM. The auxiliary storage device 40 comprises a hard disk device, a flexible disk device, a CD-ROM device and the like. A database (DB) for the search system is provided in the auxiliary storage device 40. The index indicator program according to the present invention is stored, for example, in a CD-ROM. The CPU 10 reads a processing program from the auxiliary storage device 40 to the main storage device 30 so as to execute the same. The CPU 10 writes the result of execution to the auxiliary storage device 40 and displays the same in a display of the output device 50. The CPU 10 also drives a printer so as to provide necessary printouts.

Figure 2:
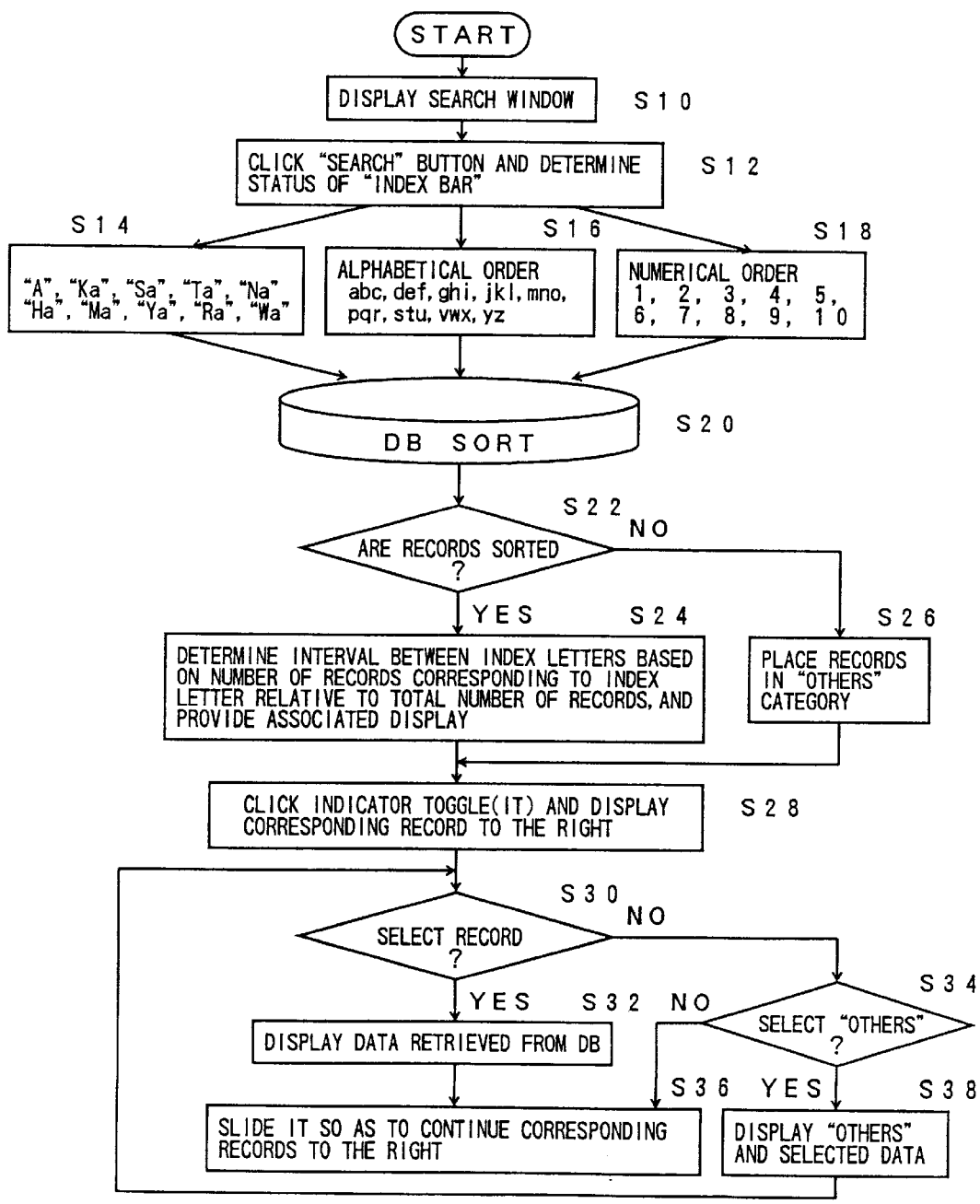
FIG. 2 is a flowchart of a search process executed by a system to which an index indicator according to the embodiment of the present invention is applied.
Figure 3:
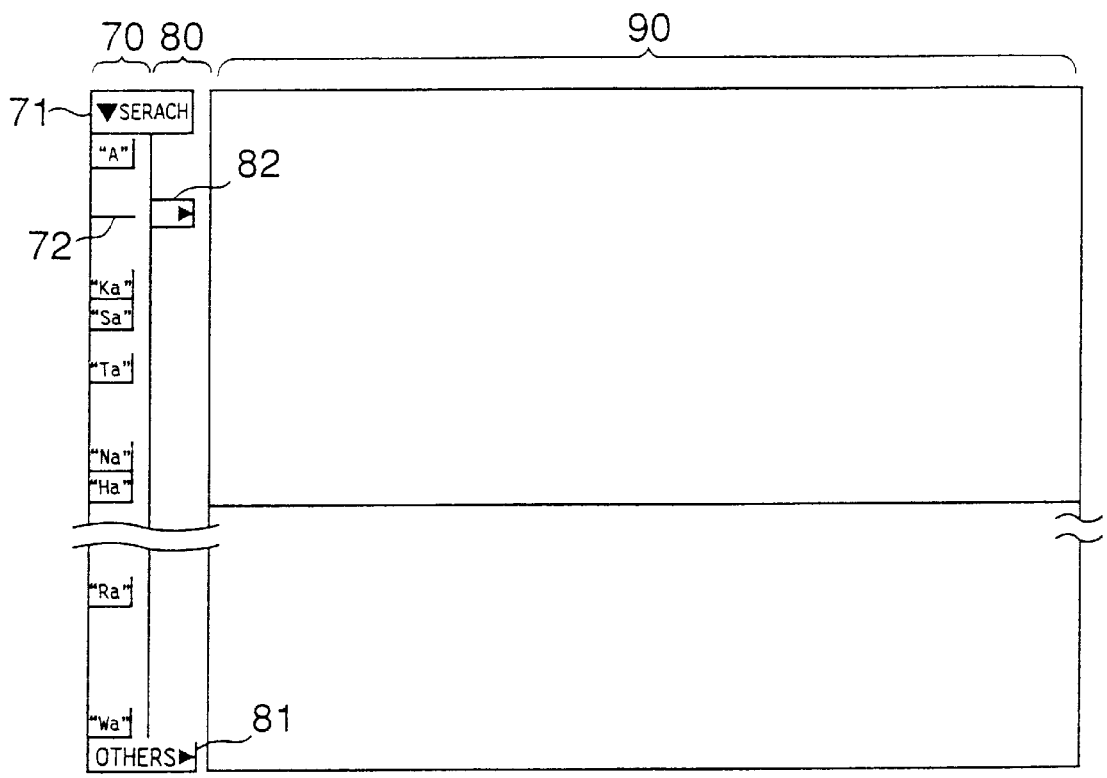
FIG. 3 shows a search window according to an embodiment of the present invention.

FIG. 2 is a flowchart of a search process executed by a system to which an index indicator according to the embodiment of the present invention is applied. Referring to FIG. 2, a search window is displayed in step S10. FIG. 3 shows a search window according to an embodiment. The search window 30 comprises an index bar (index display part) 70, an indicator bar (indicator display part) 80, and a data display part 90. A search pattern button 71 and an "others" button 81 are provided to extend across the index bar 70 and the indicator bar 80.

Figure 4:
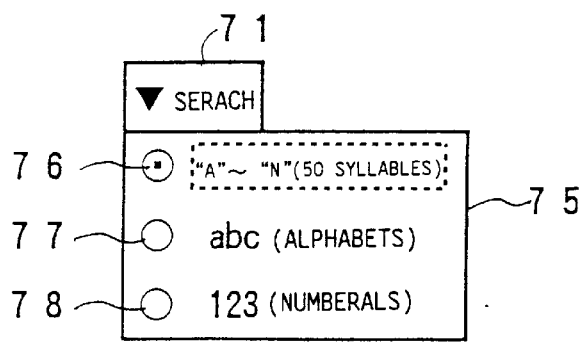
FIG. 4 shows display of a prompt for determination of a search method according to an embodiment of the present invention.

In step S12, the search pattern button 71 is clicked so as to display a prompt 75 for an input from the user for determination of a search method as shown in FIG. 4 adjacent to the search pattern button 71. Assuming that the user selects and clicks a button 76 in the prompt 75, the process proceeds from step S12 to step S14, whereupon the type of keyword (for example, name) is selected and the sorting thereof in the order of 50 syllables of the Japanese language is selected. If a button 77 is selected and clicked in the prompt 75, the process proceeds from step S12 to step S16, whereupon the type of keyword (for example, name) is selected and the sorting thereof in the alphabetical order is selected. If a button 78 is selected and clicked in the prompt 75, the process proceeds from step S12 to step S18, whereupon the type of keyword (for example, telephone number) is selected and the sorting thereof in the numerical order is selected.

Subsequently, in step S20, address data and customer management data stored in units of records (data) in the database are sorted in the selected order, using the keywords attached to the records. FIG. 6 shows an example of records of names (as pronounced in the Japanese language) in the database sorted in the order of 50 syllables responsive to the selection of the button 76 in the prompt 75.

Referring to FIG. 6, the fields in the record are delimited by commas. The first field contains a record identification number, the second field contains a name (in Chinese character), the third field contains a name (as pronounced in the Japanese language), the fourth field contains a name (in an alphabetical representation), the fifth field contains a name of a company, and the sixth field contains an address. The "others" field may contain a postal code, a telephone number or a department to which the subject belongs.

In step S22, a determination is made as to whether the records have been sorted. Those records that are sorted are subsequently processed in step S24. Those records that are not sorted are processed in step S26.

In step S24, intervals between index letters are determined based on the number and relative size of records respectively corresponding to the index letters displayed in the index bar 70. The index letters (indexes) are displayed in the index bar 70, the intervals thus determined being provided between the displayed index letters.

If the button 76 is selected and clicked in the prompt 75, the keywords (names) are sorted in the order of 50 syllables of the Japanese language so as to display index letters "A", "Ka", "Sa", "Ta", "Na" "Ha", "Ma", "Ya", "Ra" and "Wa". Keywords having the letters "A", "I", "U", "E" and "O" at the head thereof are assigned to the index letter "A"; and keywords having the letters "Ka", "Ki", "Ku", "Ke" and "Ko" at the head thereof are assigned to the index letter "Ka". Similarly, keywords are assigned to each of the index letters "Sa", "Ta", "Na", "Ha", "Ma", "Ya", "Ra" and "Wa". The index letters "A", "Ka", "Sa", "Ta", "Na", "Ha", "Ma", "Ya" , "Ra" and "Wa" are displayed as shown in FIG. 3 at intervals determined in accordance with the number of keywords assigned to the index letters. Thus, the number of keywords (records) assigned to the index letters and the distribution of keywords are known based on the intervals between the index letters displayed in the index bar 70.

If the button 77 is selected and clicked in the prompt 75, the keywords (names) are sorted in the alphabetical order so as to display index letters "A", "D", "G", "J", "M", "P", "S", "V" and "Y". Keywords having the letters "A", "B" and "C" at the head thereof are assigned to the index letter "A"; and keywords having the letters "D", "E" and "F" at the head thereof are assigned to the index letter "D". Similarly, keywords are assigned to each of the index letters "G", "J", "M", "S", "V" and "Y". The index letters "A", "D", "G", "J", "M", "P", "S", "V" and "Y" are displayed at intervals determined in accordance with the number of keywords assigned to the index letters. Thus, the number of keywords (records) assigned to the index letters and the distribution of keywords are known based on the intervals between the index letters displayed in the index bar 70.

If the button 78 is selected and clicked in the prompt 75, the keywords (postal codes) are sorted in the numerical order so as to display index numerals "1", "2", "3", "4", "5", "6", "7", "8", "9" and "0" in the index bar 70. Keywords having the numeral "1" at the head thereof are assigned to the index numeral "1"; and keywords having the numeral "2" at the head thereof are assigned to the index numeral "2". Similarly, keywords are assigned to each of the index numerals "3", "4", "5", "6", "7", "8", "9" and "0". The index letters "1", "2", "3", "4", "5", "6", "7", "8", "9" and "0" are displayed at intervals determined in accordance with the number of keywords assigned to the index numerals. Thus, the number of keywords (records) assigned to the index numerals and the distribution of keywords are known based on the intervals between the index letters displayed in the index bar 70.

According to the aforementioned example, the keywords (Japanese pronunciation, alphabets) of the names are sorted in the order of 50 syllables of the Japanese language or in the alphabetical order such that the index letters each corresponding to the letter at the head of a plurality of keywords are displayed in the index bar 70. Alternatively, the letters at the head of the keywords are used as index letters so that the intervals between the index letters are determined in accordance with the volume of records that include the index letters.

Figure 5:
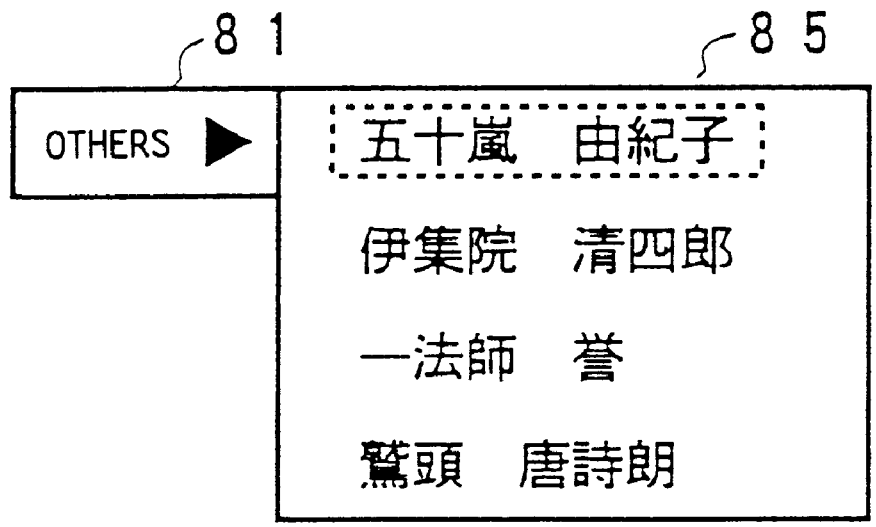
FIG. 5 shows display of an "others" category according to an embodiment of the present invention.

In step S26, those records that fail to be sorted are placed in the "others" category. By clicking the "others" button 81 in step S38, an "others" display 85 containing a list of the records placed in the "others" category is given adjacent to the "others" button 81, as shown in FIG. 5. More specifically, the "others" display 85 gives a list of keywords (names) of the records that fail to be sorted. For example, the "others" display 85 in FIG. 5 gives a list of names that fail to be sorted because the name (pronunciation) is not entered in the record when the keywords (names) were sorted in the order of 50 syllables of the Japanese language. Similarly, in a case where the postal code keywords are sorted in the numerical order, the "others" display 85 gives a list of records in which a postal code is not entered.

As shown in FIG. 3, a keyword pointer 72 is displayed in the index bar 70, and an indicator toggle 82 is displayed in the indicator bar 80. The indicator toggle 82 is provided in association with a keyword in a record. By sliding the indicator toggle 82 on the indicator bar 80, a desired record can be retrieved. The keyword pointer 72 slides on the index bar 70 in association with the sliding motion of the indicator toggle 82. By relating the position of the keyword pointer 72 to the index letters in the index bar 70, an indication is given of a relative position of the target record in the entirety of the record sorted.

Figure 7:
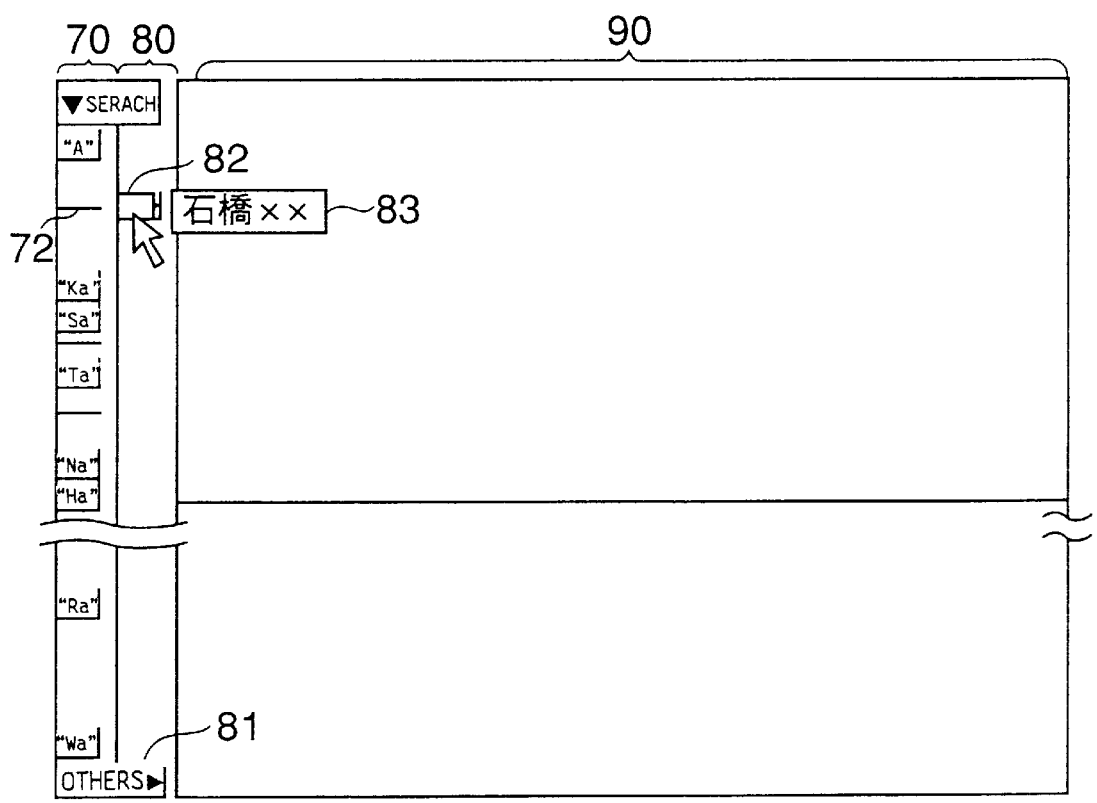
FIG. 7 shows how a search window is displayed according to the present invention.

When the user places a cursor on the indicator toggle 82 and clicks the indicator toggle 82 in step S28, a keyword display area 83 is generated adjacent to the indicator toggle 82, as shown in FIG. 7. The keyword for the target record indicated by the keyword pointer 72 is displayed in the keyword display area 83. The keyword display unit 83 continues to be displayed unless the user clicks an area other than the indicator toggle 82 and the keyword display area 83.

Figure 8:
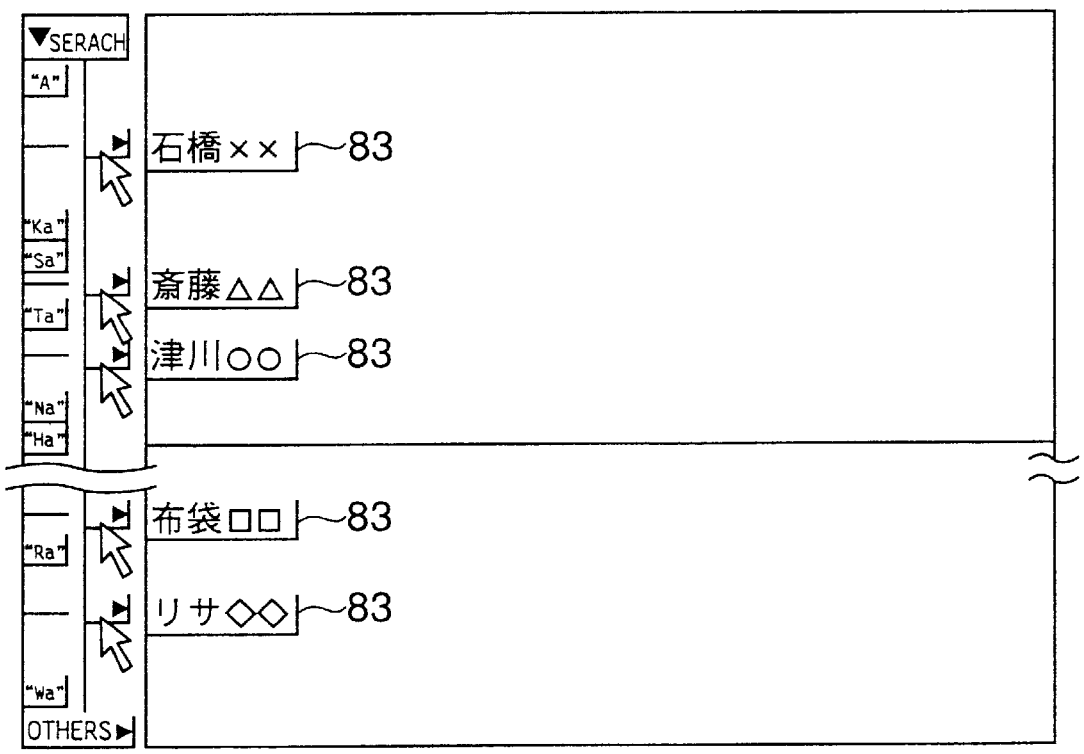
FIG. 8 shows how the search window is displayed during the search.

The indicator toggle 82 slides on the index bar 80 in association with the movement of the cursor. The keyword display area 83 and the keyword pointer 72 slide simultaneously with the indicator toggle 82. The keyword for the record corresponding to the position of the keyword pointer 72 is displayed in the keyword display area 83, as shown in FIG. 8. Thus, by sliding the indicator toggle 82, the keyword displayed in the keyword display area 83 is changed so as to facilitate the search.

In step S30 of FIG. 2, a determination is made as to whether the record is selected depending on whether the keyword displayed in the keyword display area 83 is clicked. If it is determined that the record has been selected (clicked), control is turned to step S32, whereupon the record corresponding to the keyword display din the keyword display area 83 is retrieved from the database (DB). The record selected in step S32 is displayed in the data display part 90. Controls is then turned to step S30.

If it is determined that the record has not been selected (clicked), control is turned to step S34, whereupon a determination is made as to whether the "others" button 81 is selected and clicked. If the "others" button 81 is not selected, control is turned to step S36, whereupon the keyword displayed in the keyword display area 83 is changed by sliding the indicator toggle button 82 so as to proceed with a search. Control is then turned to step S30.

Figure 9:
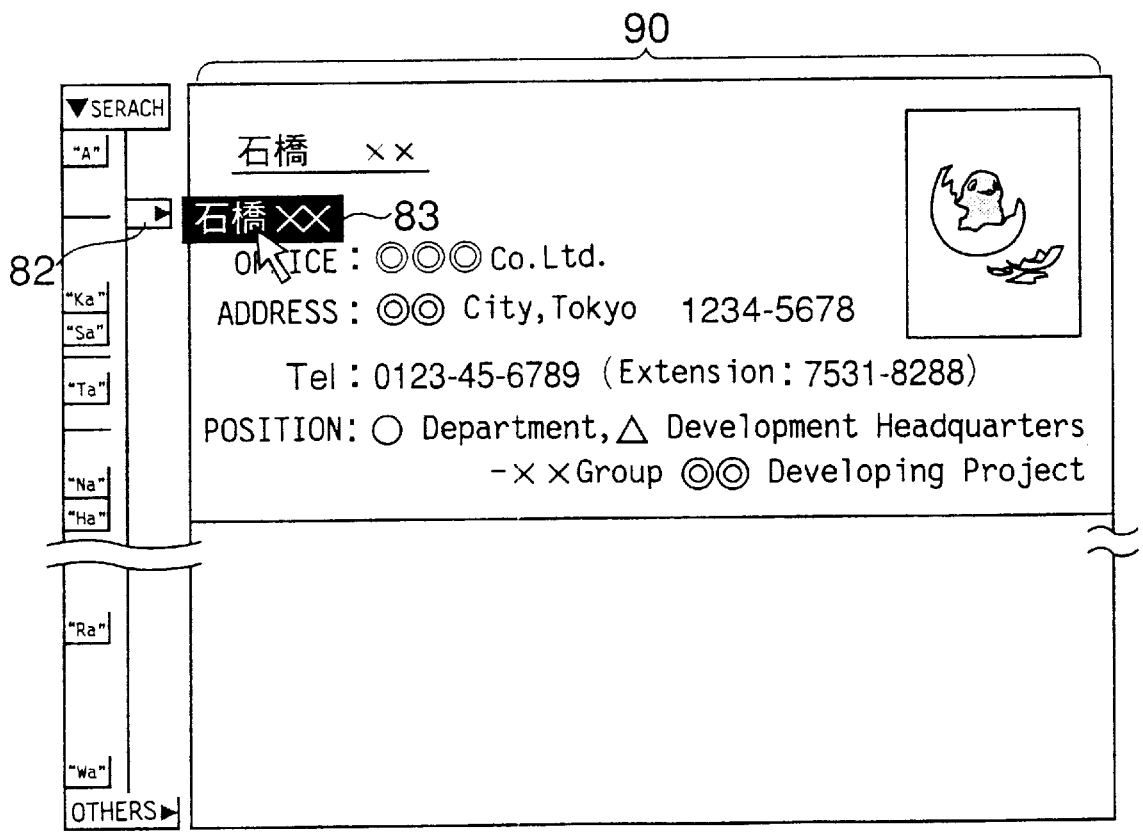
FIG. 9 shows how a record is displayed in the display window according to the present invention.

If it is determined that the "others" button 81 is selected, control is turned to step S38, whereupon the "others" display 85 is given adjacent to the "others" button 81, as shown in FIG. 5, so as to give a list of keywords (names) for the records that fail to be sorted. The record corresponding to the keyword selected from the list in the "others" display 85 is retrieved from the database (DB). The record thus retrieved is displayed in the data display part 90, as indicated by the illustration of FIG. 9. Control is then turned to step S30.

According to the invention, the intervals between a plurality of index letters are determined in accordance with a ratio between the total number of records (data) and the number of records corresponding to each of the index letters. The index letters are displayed in the index bar 70 at the intervals thus determined. In this way, the number of records associated with the indexes and the distribution of the records among the indexes are known. By providing the indicator toggle 82 (index) in the index bar 70 so as to allow selection of a desired record from the entire record and providing an associated display in the indicator bar 80, the user can determine a relative position of the record to be selected in the entirety of the record, facilitating the search process and a high-speed search.

By displaying the keyword indicated by the indicator toggle 82 in the keyword display area 83, the desired record can be retrieved. Since a keyword for only one record instead of the keywords for a plurality of records is displayed, the area required for displayed is saved.

By providing the keyword display area 83 adjacent to the indicator toggle 82 which is movable on the indicator bar 80, the keyword is changed in association with the movement of the indicator toggle 82. Thus, a high-speed search comparable with the search on a book is enabled.

The prompt 75 allows selection of the sorting method and the associated indexes. In this way, the search adapted to the search object and the user's requirement is enabled. The "others" display 85 displays a list of records that fail to be sorted so that it is possible to retrieve records that fail to be sorted.

Steps S10 and S24 correspond to the index display unit, step S10 corresponds to the indicator display means, step S28 corresponds to the keyword display means, the prompt 75 corresponds to the sorting selection means, and the "others" display 85 corresponds to the unsorted record display means.

The present invention is not limited to the above-described embodiments, and variations and modifications may be made without departing from the scope of the present invention.

What is claimed is:

1. An index indicator that provides an index for assisting a search for a desired data item, comprising:

an index interval determining unit for determining intervals between a plurality of indexes in accordance with a total number of data items and a number of data items corresponding to each of the plurality of indexes;

a displaying unit displaying the plurality of indexes in an index display area at the intervals determined by said index interval determining unit.

2. The index indicator according to claim 1, further comprising:

an indicator displaying unit displaying, in an indicator display area, an indicator that aids selection of a desired data item from the entirety of data, the display being given in association with said index display area.

3. The index indicator according to claim 2, further comprising a keyword displaying unit displaying a keyword associated with the data item indicated by said indicator.

4. The index indicator according to claim 3, wherein said keyword displaying unit displays the keyword adjacent to said indicator.

5. The index indicator according to claim 1, wherein the index for the data item is determined in accordance with a keyword associated with the data item and used in sorting the entirety of data.

6. The index indicator according to claim 5, further comprising a sort selection unit selecting a method of sorting the entirety of data and a type of index to be used in the sorting, and for sorting the entirety of data using the selected method.

7. The index indicator according to claim 6, further comprising an unsorted data display unit displaying data items that fail to be sorted.

8. The index indicator according to claim 6, wherein the keywords for the entirety of data are sorted in the order of 50 syllables of the Japanese language.

9. The index indicator according to claim 6, wherein the keywords for the entirety of data are sorted in the alphabetical order.

10. The index indicator according to claim 6, wherein the keywords for the entirety of data are sorted in the numerical order.

11. An index display method for displaying an index for assisting a search for a desired data item, comprising the steps of:

determining intervals between a plurality of indexes in accordance with a total number of data items and a number of data items corresponding to each of the plurality of indexes;

a displaying unit displaying the plurality of indexes at the intervals determined in said determining step.

12. The index display method according to claim 11, further comprising the step of:

displaying an indicator that aids selection of a desired data item from an entirety of data.

13. The index display method according to claim 12, wherein the index for the data item is determined in accordance with a keyword associated with the data item and used in sorting the entirety of data.

14. The index display method according to claim 13, further comprising the step of selecting a method of sorting the entirety of data and a type of index to be used in the sorting, and for sorting the entirety of data using the selected method.

15. The index display method according to claim 11, further comprising the step of displaying a keyword associated with the data item indicated by said indicator.

16. The index display method according to claim 15, wherein the keyword is displayed adjacent to said indicator.

17. A machine-readable recording medium storing a program that causes a computer to operate as an index displaying for determining intervals between a plurality of indexes in accordance with a total number of data items and a number of data items corresponding to each of the plurality of indexes, and for displaying, in an index display area, the plurality of indexes at the intervals determined in said determining step.

18. The machine-readable recording medium according to claim 17, storing a program that causes a computer to display an indicator that aids selection of a desired data item from an entirety of data, the display being given in association with the index display area.

19. The machine-readable recording medium according to claim 18, storing a program that causes a computer to operate as a keyword displaying unit displaying a keyword associated with the data item indicated by said indicator.

20. The machine-readable recording medium according to claim 19, storing a program that causes a computer to operates as a sort selection unit selecting a method of sorting the entirety of data and a type of index to be used in the sorting, and for sorting the entirety of data using the selected method.

21. The machine-readable recording medium according to claim 20, wherein a program that causes a computer to operate as an unsorted data display unit displaying data items that fail to be sorted.

* * * * *